(12) United States Patent
Nishikawa

(10) Patent No.: US 6,819,511 B2
(45) Date of Patent: Nov. 16, 2004

(54) MAGNETIC TRANSFER METHOD AND MAGNETIC RECORDING MEDIUM

(75) Inventor: Masakazu Nishikawa, Odawara (JP)

(73) Assignee: Fuji Photo Film Co., Ltd., Kanagawa (JP)

(*) Notice: Subject to any disclaimer, the term of this patent is extended or adjusted under 35 U.S.C. 154(b) by 387 days.

(21) Appl. No.: 09/855,801

(22) Filed: May 16, 2001

(65) Prior Publication Data

US 2001/0055168 A1 Dec. 27, 2001

(30) Foreign Application Priority Data

May 16, 2000 (JP) ........................................ 2000-143279

(51) Int. Cl.[7] .............................................. G11B 5/86
(52) U.S. Cl. ...................................................... 360/17
(58) Field of Search ............................. 360/17, 16, 15, 360/135, 77.08

(56) References Cited

U.S. PATENT DOCUMENTS 3,869,711 A * 3/1975 Bernard ........................ 360/17
5,303,092 A * 4/1994 Noda .......................... 360/17
6,577,459 B1 * 6/2003 Komatsu ...................... 360/15

FOREIGN PATENT DOCUMENTS

| EP | 10-40544 | 2/1998 |
|---|---|---|
| JP | 63183623 | 7/1988 |
| JP | 10-269566 | 10/1998 |
| JP | 0915456 A1 | 5/1999 |

* cited by examiner

Primary Examiner—Alan T. Faber
(74) Attorney, Agent, or Firm—Sughrue Mion, PLLC

(57) ABSTRACT

The invention provides a method for performing magnetic transfer by bringing a master carrier for magnetic transfer and a slave medium in close contact with each other and by applying a magnetic field for transfer, whereby a product (Ms1δ1) of saturation magnetization (Ms1) and film thickness (δ1) of a magnetic layer of the master carrier to be used for magnetic transfer on a surface of the slave medium with earlier magnetic transfer and a product (Ms2δ2) of saturation magnetization (Ms2) and film thickness (δ2) of a magnetic layer of the master carrier are in a relation of: 1.5<(MS2δ2)/(Ms1δ1)<10, and a transfer magnetic field (Hdu1) applied to the surface with the earlier magnetic transfer and a transfer magnetic field (Hdu2) on the surface of the slave medium with the subsequent magnetic transfer are in a relation of: 0.2≦Hdu2/Hdu1≦0.9.

5 Claims, 1 Drawing Sheet

Initial DC magnetization process

DC magnetic field

Duplication process I

Duplication process II

MAGNETIC TRANSFER METHOD AND MAGNETIC RECORDING MEDIUM

BACKGROUND OF THE INVENTION

The present invention relates to a method for recording a large number of information at one time to a magnetic recording medium. In particular, the invention relates to a magnetic transfer method for transferring recording information to a magnetic recording medium of large capacity and high recording density.

With rapid propagation and progress in the technique to utilize digital image, the amount of information processed by devices such as personal computer has extensively increased. To cope with the increase of the amount of information, there are now strong demands on a magnetic recording medium, which has large capacity for information recording and is available at low cost, and further, can record and read within shorter time.

In a high-density recording medium, e.g. hard disk or large capacity removable type magnetic recording medium such as ZIP (Iomega Inc.), the information recording region has narrower tracks compared with floppy disk. In order to accurately scan the magnetic head with narrower track width and to record and reproduce signals at high S/N ratio, it is necessary to perform accurate scanning by using tracking servo technique.

In this respect, for a large capacity magnetic recording medium such as hard disk, removable type magnetic recording medium, etc., the so-called "preformatting" is performed, i.e. servo signals for tracking, address information signals, reproduction clock signals, etc. are recorded with a given spacing within one turn of the disk.

The magnetic head reads the preformat signals and corrects its own position, and it can run accurately on the track.

At present, the preformatting is performed as follows: Using a special-purpose servo recording system, disks are recorded one by one and track by track. The servo recording system is very expensive and long time is required for the preformatting, and this gives considerable influence on the manufacturing cost.

For this reason, techniques of magnetic transfer without resorting to the track-by-track preformatting have been proposed. For instance, transfer techniques are proposed in JP-63183623 (A), EP-0915456 JP-10-40544 and JP-10-269566). However, there has been no proposal suitable for practical application so far, e.g. proposals on the condition of magnetic field to be applied at the time of transfer or on the means for generating magnetic field.

As a recording method to solve the above problems, EP-0915456 proposes the following method: Surface irregularities (i.e. convex and concave portions) corresponding to information signals are formed on the surface of a base material. On a master carrier for magnetic transfer, ferromagnetic thin film is formed at least on the surface of convex portions, and this master carrier is brought into contact with the surface of a sheet-type or disk-type magnetic recording medium where ferromagnetic thin film or ferromagnetic powder coating layer is formed. Or, AC bias magnetic field or DC magnetic field is applied, and the ferromagnetic material on the surface of the convex portion is excited. Then, magnetized patterns corresponding to convex and concave portions are recorded on the magnetic recording medium.

According to this method, the surface of the convex portions of the master carrier for magnetic transfer is brought into close contact with the magnetic recording medium to be preformatted, i.e. a slave medium. By exiting the ferromagnetic material on the convex portions, a predetermined format is formed on the slave medium. Thus, static recording can be carried out without changing relative positions of the master carrier and the slave medium, and accurate preformat recording can be achieved. Moreover, the time required for the recording is very short. Specifically, in the method for recording from the magnetic head as described above, the time of several to several tens of minutes is required for recording, and the time required for magnetic transfer is further extended in proportion to the recording capacity. By the new magnetic transfer method, magnetic transfer can be achieved within one second regardless of the recording capacity or recording density.

According to this method for magnetic transfer, the surface of convex portions of the master carrier for magnetic transfer is brought into close contact with the magnetic recording medium to be preformatted, i.e. the slave medium, and the ferromagnetic material of the convex portions is excited. Then, a predetermined preformat information is recorded on the slave medium. By this method, static recording can be achieved without changing relative positions of the master carrier and the slave medium, and accurate preformat recording can be performed. Also, this method is characterized in that the time required for the recording is very short.

However, warping of several $\mu$m occurs unavoidably on a substrate used as the slave medium. For this reason, in order to perform magnetic transfer on both surfaces of the slave medium at the same time, it is necessary to bring the master carrier into contact with the slave medium from both surfaces. To maintain close contact with the slave medium, strong force is required for compression.

As a result, when magnetic transfer is repeatedly performed, the master carrier for magnetic transfer may be damaged when it is brought into close contact with the slave medium. In this respect, to improve durability of the master carrier for magnetic transfer, it has been practiced to perform magnetic transfer on one surface at a time.

However, a problem arises when magnetic transfer is performed on one surface at a time. Specifically, when magnetic field is applied on a surface opposite to the surface of the slave medium, on which magnetic transfer has been already performed, the magnetic recording signals already recorded may be erased or may drop off.

To solve the above problems, it is an object of the present invention to provide a stable transfer method, by which the master carrier for magnetic transfer is brought into close contact with one surface of the slave medium at a time. Then, an external magnetic field is applied, and inaccurate servo operation on the slave medium is prevented which occurs as the result of the transfer of the preformat pattern.

SUMMARY OF THE INVENTION

The present invention provides a method for performing magnetic transfer by bringing a master carrier for magnetic transfer and a slave medium in close contact with each other and by applying a magnetic field for transfer, whereby a product ($Ms_1\delta_1$) of saturation magnetization ($Ms_1$) and film thickness ($\delta_1$) of a magnetic layer of the master carrier to be used for magnetic transfer on a surface of the slave medium with earlier magnetic transfer and a product ($Ms_2\delta_2$) of saturation magnetization ($Ms_2$) and film thickness ($\delta_2$) of a magnetic layer of the master carrier to be used for magnetic transfer on the other surface of the slave medium with subsequent magnetic transfer are in a relation of: $1.5<(Ms2\delta2)/(Ms1\delta1)<10$, and a transfer magnetic field (Hdu1) applied to the surface with the earlier magnetic transfer and a transfer magnetic field (Hdu2) on the surface of the slave medium with the subsequent magnetic transfer are in a relation of: $0.2 \leq Hdu2/Hdu1 \leq 0.9$.

Further, the present invention provides a magnetic transfer method as described above, wherein magnetic transfer performed using the master carrier for magnetic transfer with a magnetic layer formed on a portion corresponding to an information signal on the surface of a substrate and the slave medium to receive magnetic transfer, the slave medium is first magnetized by initial DC magnetization in track direction (see FIG. 1(a)), the master carrier for magnetic transfer is brought into close contact with the slave medium processed by initial DC magnetization, and magnetic transfer is preformed by applying a transfer magnetic field in a direction opposite to the direction of the initial DC magnetization on the surface of the slave medium.

Also, the present invention provides a magnetic recording medium as described above, wherein a product (Ms1 δ1) of saturation magnetization (Ms1) and film thickness (δ1) of a magnetic layer of the master carrier for transfer of the servo signal used for magnetic transfer to a surface with earlier magnetic transfer and a product (Ms2 δ2) of saturation magnetization (Ms2) and film thickness (δ2) of a magnetic layer of the master carrier for transfer of the servo signal used for transfer to a surface of the magnetic recording medium of the subsequent magnetic transfer are in a relation of: $1.5<(Ms2\delta2)/(Ms1\delta1)<10$, and the servo signal is transferred under the condition that a transfer magnetic field (Hdu1) on the surface with the earlier magnetic transfer and a transfer magnetic field (Hdu2) on the surface of the magnetic recording medium with the subsequent magnetic transfer are in a relation of: $0.2 \leq Hdu2/Hdu1 \leq 0.9$.

Further, the present invention provides a magnetic recording medium as described above, wherein the magnetic recording medium is first magnetized by initial DC magnetization in track direction, the master carrier for transferring the servo signal is brought into close contact with the magnetic recording medium processed by the initial DC magnetization, a magnetic field for transfer is applied in a direction opposite to the direction of the initial DC magnetization on the surface of the magnetic recording medium, and the servo signal is transferred by magnetic transfer.

Also, the present invention provides a magnetic recording medium as described above, wherein the magnetic recording medium is a floppy disk type magnetic recording medium comprising a flexible base material or a hard disk type magnetic recording medium comprising a rigid base material.

Figure 1A:
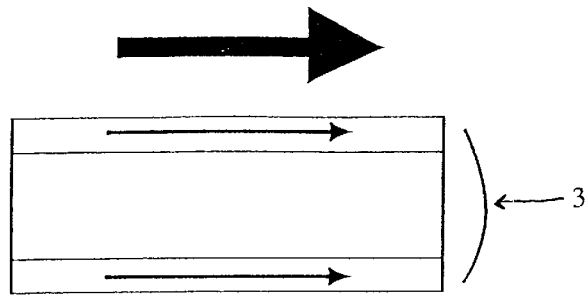
FIGS. 1(a), (b) and (c) are views of the magnetic transfer medium and magnetization process.

In the drawing:
1: master carrier 1
2: master carrier 2
3: slave media/medium

DESCRIPTION OF THE PREFERRED EMBODIMENT

When the master carrier is brought into close contact with the slave medium on one surface at a time, and a magnetic field for transfer is applied and signals such as servo signals are recorded on both surfaces of the slave medium, the quality of the signals are often decreased at least partially. The present inventors have found that such deterioration of signal quality occurs because saturation magnetization, its thickness and magnetic field to be applied for transfer are not adequate on the master carrier used for magnetic transfer to a surface where magnetic transfer has been already performed once. As a result, the signals already recorded are often erased or drop off when magnetic transfer is performed subsequently.

Figure 1B:
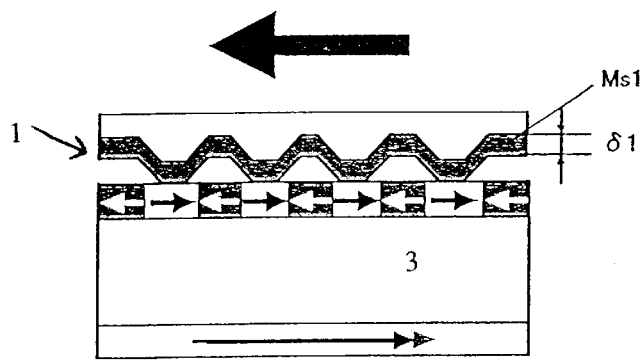
Figure 1C:
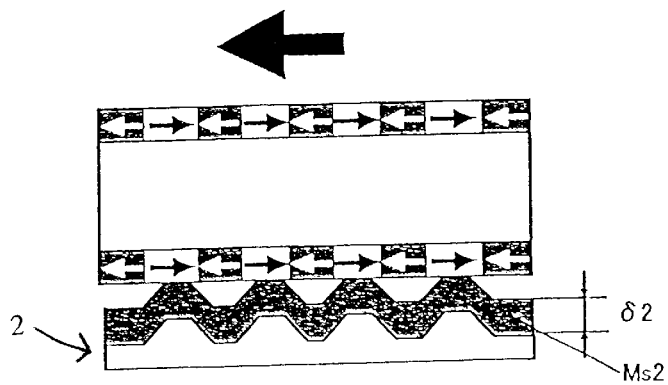

Specifically, the present invention provides a method for performing magnetic transfer by bringing a master carrier for magnetic transfer and a slave medium in close contact with each other and by applying a magnetic field for transfer, whereby a product (Ms1δ1) of saturation magnetization (Ms1) and film thickness (δ1) of a magnetic layer of the master carrier 1 to be used for magnetic transfer on a surface of the slave medium 3 with earlier magnetic transfer and a product (MS2δ2) of saturation magnetization (Ms2) and film thickness (δ2) of a magnetic layer of the master carrier 2 to be used for magnetic transfer on the other surface of the slave medium 3 with subsequent magnetic transfer are in a relation of: $1.5<(MS2\delta2)/(Ms1\delta1)<10$, and a transfer magnetic field (Hdu1) in FIG. 1(b) applied to the surface with the earlier magnetic transfer and a transfer magnetic field (Hdu2) in FIG. 1(c) on the surface of the slave medium 3 with the subsequent magnetic transfer are in a relation of: $0.2 \leq Hdu2/Hdu1 \leq 0.9$.

The substrate used for the slave medium of floppy disk type is generally made of synthetic resin material, and it is unavoidable that warping of several μm occurs. For this reason, when the master carrier is brought into close contact with both surfaces of the slave medium at one time, it is necessary to use strong force for compression to maintain close contact between the master carrier and the slave medium when these are in contact with each other on both surfaces.

However, when magnetic transfer is repeatedly performed, the master carrier is often damaged as it is brought into close contact with the slave medium. For this reason, to improve durability of the master carrier for magnetic transfer, magnetic transfer must be performed on one surface at a time.

When magnetic transfer is performed on one surface at a time, as magnetic field is applied on a surface of the slave medium opposite to the surface where magnetic transfer has been already performed, the magnetic recording signals recorded earlier may be erased or may drop off.

On the other hand, if the intensity of the transfer magnetic field is low, it is not possible to transfer the recording signals of high quality. However, it has been found that, when magnitude of the transfer signal, and properties and size of the magnetic layer on the master carrier are adequately adjusted, it is possible to record signals of high quality without resulting in erasing or drop-off of the recording signals transferred earlier.

When the master carrier and the slave medium are brought into close contact with each other and magnetic field for magnetic transfer is applied, the quality of the transfer signals and width of the transfer magnetic field can be improved when a product (Msδ) of saturation magnetization (Ms) and film thickness (δ) of the magnetic layer is adjusted to a predetermined value.

This means that the transfer magnetic field can be adjusted by changing the product (Ms1δ1), i.e. a product of saturation magnetization (Ms1) and film thickness (δ1) of the magnetic layer. Specifically, when the value of $Ms\delta$ of the magnetic layer on the master carrier is increased, magnetic transfer can be performed even when the transfer magnetic field is low.

Therefore, when magnetic transfer is performed on one surface at a time and when magnetic recording signal has been transferred already on one surface and magnetic transfer is performed subsequently on another surface of the magnetic recording medium, the transfer magnetic field can be decreased by increasing the value of $Ms\delta$ of the magnetic layer on the master carrier. By decreasing the size of the transfer magnetic field to a value lower than coercive force of the slave medium, it is possible to prevent the deterioration of signal quality on the surface where magnetic transfer has been performed earlier.

In case the value of $(Ms2\delta2)/(Ms1\delta1)$ is lower than 1.5, the transfer magnetic field necessary for magnetic transfer is the same or higher than the magnetic field on the surface where magnetic transfer has been performed already, and this leads to deterioration of the signals on the surface where magnetic transfer has been performed already.

On the other hand, in case the value of $(Ms2\delta2)/(Ms1\delta1)$ is higher than 10, when the master carrier is separated from the slave medium after magnetic transfer, magnetic transfer may occur due to residual magnetic field of an electromagnet used for application of magnetic field, and this may result in deterioration of signals on the surface where magnetic transfer is performed subsequently.

Then, evaluation was made on the relation of the transfer magnetic field strength between the surface with the earlier magnetic transfer and the surface with the subsequent magnetic transfer when the condition of $(Ms2\delta2)/(Ms1\delta1)$ is satisfied. Then, it has been found that the signal quality of the magnetic transfer signals can be maintained at satisfactory level when a transfer magnetic field (Hdu1) on the surface with the earlier magnetic transfer and a transfer magnetic field (Hdu2) on the surface with the subsequent magnetic transfer, i.e. the surface on opposite side of the surface with the earlier magnetic transfer, are maintained in the relation of $0.2 \leq Hdu2/Hdu1 \leq 0.9$.

When the relation is Hdu2/Hdu2<0.2, sufficient magnetic transfer is not performed on the surface with the subsequent magnetic transfer, and it is not possible to maintain signal quality at a satisfactory level suitable for practical application. If the condition is: Hdu2/Hdu1>0.9, recording signals on the surface with the earlier magnetic transfer are disturbed, and signal quality is decreased.

Accordingly, a product $(Ms1\delta1)$ of saturation magnetization (Ms1) and film thickness ($\delta1$) of the magnetic layer on the master carrier used for the magnetic transfer and a product $(MS2\delta2)$ of saturation magnetization (Ms2) and film thickness ($\delta2$) of the magnetic layer of the master carrier used for the magnetic transfer on the surface on opposite side should be kept in the relation of: $1.5<(MS2\delta2)/(Ms1\delta1)<10$. Also, a magnetic field (Hdu1) to be applied on the surface with the earlier magnetic transfer and a transfer magnetic field (Hdu2) on the surface on opposite side of the slave medium should be kept in the relation of: $0.2 \leq Hdu2/Hdu1 \leq 0.9$. Then, a magnetic transfer method can be provided, which can prevent deterioration of signal quality when magnetic transfer is performed on one surface at a time.

In the above explanation, description has been given on the case where magnetic transfer is performed on a floppy disk type slave medium. However, by applying the method of the present invention to the case where magnetic transfer is performed using a hard disk with a rigid base material as the slave medium, the quality of the magnetic transfer signal can be improved.

Now, description will be given on a method for manufacturing the master carrier for magnetic transfer to be used in the magnetic transfer of the present invention.

As the substrate, the materials such as silicon, aluminum, glass, macromolecular material, etc. may be used. The material must have smooth surface. Photo resist is coated on the substrate, and patterning is performed by collective exposure or direct marking using mask.

In case of collective exposure, etching is performed by reactive etching, or physical etching by argon, or the substrate is etched using etching solution.

Next, the magnetic layer is formed to the etched thickness or the desired thickness by sputtering. Photo resist is removed by lift-off method. Convex portions on the magnetic layer only may be fabricated by photo-fabrication.

For the purpose of performing fine fabrication, a method using a stamper or injection molding may be applied. When there are burrs, these may be removed by burnishing or polishing.

As the magnetic material, it is preferable that it has high magnetic flux density and has magnetic anisotropy of the same direction as the slave medium (in-plane direction in case of in-plane recording, and vertical direction in case of vertical) to provide clear and fine magnetic transfer. More concretely, the following materials may be used: Co, Co alloy (such as CoNi, CoNiZr, CoNbTaZr, etc.), Fe, Fe alloy (such as FeCo, FeCoNi, FeNiMo, FeAlSi, FeAl, FeTaN), Ni, Ni alloy (such as NiFe).

More preferably, FeCo or FeCoNi may be used.

Prior to the formation of the magnetic layer of the master carrier for magnetic transfer to be used in the magnetic transfer method of the present invention, it is preferable to provide a nonmagnetic primer layer, and it is also preferable that crystal structure and lattice constant of the primer layer are equalized with those of the magnetic layer.

As the material for forming the primer layer, Cr, CrTi, CoCr, CrTa, CrMo, NiAl, Ru, etc. may be used.

A protective film such as diamond-like carbon (DLC) may be provided on the magnetic layer or a lubricant layer may be arranged. In particular, it is preferable to provide a diamond-like carbon film of 5–30 nm and a lubricant as the protective film. If lubricant is provided, friction caused by deviation in the process of contact with the slave medium can be corrected. If the lubricant layer is not provided, resistance to damage and durability are not high enough.

It is preferable that a product $(Ms1\delta1)$ of saturation magnetization (Ms1) and film thickness ($\delta1$) of the magnetic layer on the master carrier and a product $(MS2\delta2)$ of saturation magnetization (Ms2) and film thickness ($\delta2$) of the magnetic layer of the master carrier used for transfer on the surface of the slave medium and to be brought into close contact with the magnetic transfer surface satisfy the relation of: $1.5<(Ms2\delta2)/(Ms1\delta1)<10$. More preferably, it is in the range of: $1.5<(Ms2\delta2)/(Ms1\delta1)<7$.

Also, it is preferable that a product $(Ms1\delta1)$ of saturation magnetization (Ms1) and film thickness ($\delta1$) of the magnetic layer of the master carrier to be used for the surface with the earlier magnetic transfer is in the range of 0.025 to 2.3 T·$\mu$m (20 to 1830 G·$\mu$m). This is necessary to maintain signal quality on the surface with the earlier magnetic transfer.

The value of $Ms\delta$ of the magnetic layer on the master carrier is adjusted by changing material and thickness of the magnetic layer, manufacturing temperature, sputtering time, and type of gas used in the atmosphere for sputtering.

The value of Ms may be adjusted by changing the adding quantity of nonmagnetic elements such as Cr, Ti, etc., or the manufacturing temperature may be regulated to adjust homogeneity of the magnetic layer on the master carrier, or the value of Ms may be adjusted.

For FeCo (65:35 in atom ratio), the value of Ms can be adjusted within the range of 2.0 to 2.3 T by setting the manufacturing temperature to the range from room temperature to 200° C.

Also, by manufacturing the magnetic layer in mixed atmosphere of argon, oxygen, nitrogen, etc., the magnetic layer is oxidized and nitrided, and the value of Ms of the magnetic layer can be adjusted. The value of Ms can be adjusted by partial pressure of oxygen and nitrogen.

The master carrier for magnetic transfer preferably has a magnetic layer with thickness in the range of 50 to 800 nm, or more preferably in the range of 100 to 500 nm.

As the slave medium, a coating type magnetic recording medium or a metal thin film type magnetic recording medium may be used. Or, a magnetic recording medium with a magnetic layer formed on a rigid base material or a floppy disk type magnetic recording medium with a magnetic layer formed on synthetic resin film may be used.

As the magnetic recording medium with the magnetic layer formed on rigid base material, hard disk type magnetic recording medium such as hard disk or removable hard disk with the magnetic layer formed on a rigid base material, e.g. aluminum, glass, etc., may be used.

As the coating type magnetic recording medium, Zip 100, Zip 250, etc. for ZIP (Iomega Inc), or floppy disk type magnetic recording medium such as HiFD may be used.

As the metal thin film type magnetic recording medium, the following material can be used as the magnetic material: Co, Co alloy (such as CoPtCr, CoCr, CoPtCrTa, CoPtCrNbTa, CoCrB, CoNi), Fe, Fe alloy (such as FeCo, FePt, FeCoNi).

To achieve clear and definite transfer, it is essential that the material has high magnetic flux density and magnetic anisotropy in the same direction as the magnetic layer of the master carrier, i.e. in in-plane direction if it is in-plane recording, and in vertical direction if it is vertical recording.

To form magnetic anisotropy required on the lower portion of the magnetic layer, i.e. on substrate side, it is preferable to provide a nonmagnetic primer layer. Also, it is preferable that crystal structure and lattice constant are equalized with those of the magnetic layer. More concretely, as the material for forming the primer layer, Cr, CrTi, CoCr, CrTa, CrMo, Ni, Ru, etc. may be used.

It is preferable that the transfer magnetic field (Hdu1) on the surface where magnetic transfer has been performed earlier and the transfer magnetic field (Hdu2) on the surface of the slave medium on opposite side surface is in the relation of: $0.2 \leq Hdu2/Hdu1 \leq 0.9$. Or, more preferably, it is within the range of $0.3 \leq Hdu2/Hdu1 \leq 0.7$.

Coercive force (Hc) of the slave medium is preferably in the range of 79.8 to 398 kA/m (1000 to 5000 Oe), or more preferably, in the range of 119 to 358 kA/m (1500 to 4500 Oe).

Also, it is preferable that transfer magnetic field (Hdu1) of the surface with the earlier magnetic transfer and the value of Hc of the slave medium is in the relation of: $0.4<(Hdu1/Hc)<2.0$. Or, more preferably, it is within the range of $0.7<(Hdu1/Hc)<1.7$.

Now, description will be given on several examples to explain the present invention.

EXAMPLE 1

For a 3.5 type master carrier for magnetic transfer, a magnetic layer of 150 nm in thickness comprising FeCo (atom ratio Fe:Co=50:50) was formed using a silicon wafer disk as a substrate. The pattern was set to radial line with equal spacing of 1.5 μm in width from the center of the disk to a position of 20–40 mm in radial direction, and line spacing was set to 1.5 μm at the innermost peripheral position of 20 mm in radial direction.

On a 3.5 type master carrier for magnetic transfer to be used for the subsequent magnetic transfer, a magnetic layer of 300 nm in thickness comprising FeCo (atom ratio Fe:Co=50:50) was formed with a silicon wafer disk as a substrate, and a pattern was formed in the same procedure as on the magnetic layer of the master carrier for the earlier magnetic transfer.

The magnetic layer was formed by DC sputtering method using a sputtering system (730H; manufactured by Anerva Co.). Manufacturing temperature was set to 25° C., sputtering pressure to $1.0 \times 10^{-3}$ Pa (0.72 mTorr), and the power supplied was 2.80 W/cm².

For the adjustment of film thickness, magnetic material was formed for 10 minutes on a silicon substrate with marking. This specimen was washed with acetone, and the marking was removed. Graded step in the film thickness on this portion was measured by a contact type step meter, and sputtering speed was calculated from the relation between film thickness and sputtering time. Next, the time required for forming the desired film thickness was calculated from the sputtering speed, and film was formed for the duration time as required.

As the slave medium, a coating type magnetic medium (manufactured by Fuji Photo Film Co., Ltd.) for Zip 250 (Iomega Inc.) as commercially marketed was used. Coercive force (Hc) of the slave medium was 199 kA/m (2500 Oe).

An electromagnet system was used so that peak magnetic field intensity was to be 398 kA/m (5000 Oe), i.e. 2 times higher than the coercive force (Hc) of the slave medium, and initial DC magnetization was performed on the slave medium. Next, the slave medium processed by the initial DC magnetization was brought into close contact with the master carrier as described above. A magnetic field of 199 kA/m (2500 Oe) was applied using the electromagnet system, and magnetic transfer was preformed.

Next, after the completion of the magnetic transfer to one surface of the magnetic recording medium, the master carrier was separated from the surface of the magnetic transfer. Then, the master carrier to be used for the subsequent magnetic transfer was brought into close contact with the surface of the slave medium, i.e. on the opposite side of the surface with the earlier magnetic transfer. Then, using the electromagnet system, magnetic field of 99.5 kA/m (1250 Oe) was applied in the same direction as the direction of the earlier magnetic transfer, and magnetic transfer was performed.

On the slave medium thus obtained, magnetic transfer information was evaluated by the evaluation methods given below. The results are summarized in Table 1.

EXAMPLE 2

A slave medium was prepared by magnetic transfer in the same procedure as in Example 1 except that intensity of the transfer magnetic field for the subsequent magnetic transfer as described in Example 1 was changed to 39.8 kA/m (500 Oe). Evaluation was made by the same procedure as in Example 1. The results are shown in Table 1.

EXAMPLE 3

A slave medium was prepared by magnetic transfer in the same procedure as in Example 1 except that intensity of the transfer magnetic field for the subsequent magnetic transfer as described in Example 1 was changed to 159 kA/m (2000 Oe). Evaluation was made by the same procedure as in Example 1. The results are shown in Table 1.

EXAMPLE 4

A slave medium was prepared by magnetic transfer in the same procedure as in Example 1 except that the magnetic layer of the master carrier to be used for the preceding or the earlier magnetic transfer was produced under the following condition: argon:oxygen=$2.0 \times 10^{-3}$ Pa (1.44 mTorr):$3.0 \times 10^{-3}$ Pa (2.16 mTorr). Evaluation was made by the same procedure as in Example 1. The results are shown in Table 1.

EXAMPLE 5

A slave medium was prepared in the same procedure as in Example 4 except that the thickness of the magnetic layer of the master carrier for the subsequent magnetic transfer as described in Example 4 was changed to 800 nm. Evaluation was made by the same procedure as in Example 1. The results are shown in Table 1.

COMPARATIVE EXAMPLE 1

A slave medium was prepared by magnetic transfer in the same procedure as in Example 1 except that intensity of the transfer magnetic field of the subsequent magnetic transfer as described in Example 1 was changed to 199 kA/m (2500 Oe). Evaluation was made by the same procedure as in Example 1. The results are shown in Table 1.

COMPARATIVE EXAMPLE 2

A slave medium was prepared by magnetic transfer in the same procedure as in Example 1 except that intensity of the magnetic field of the subsequent magnetic transfer as described in Example 1 was changed to 199 kA/m (2500 Oe). Evaluation was made by the same procedure as in Example 1. The results are shown in Table 1.

COMPARATIVE EXAMPLE 3

A slave medium was prepared by magnetic transfer in the same procedure as in Example 1 except that the master carrier for the earlier magnetic transfer as described in Example 1 was replaced by the master carrier for the subsequent magnetic transfer. Evaluation was made by the same procedure as in Example 1. The results are shown in Table 1.

COMPARATIVE EXAMPLE 4

Magnetic transfer was performed by the same procedure as in Example 1 except that the intensity of the earlier magnetic transfer as described in Example 1 was changed to the intensity of the subsequent magnetic transfer. Evaluation was made by the same procedure as in Example 1. The results are shown in Table 1.

COMPARATIVE EXAMPLE 5

Magnetic transfer was performed by the same procedure as in Example 1 except that the master carrier for the subsequent magnetic transfer as described in Example 1 was changed to the following condition: Fe:Co=70:30 (atom ratio) and film thickness of 1500 nm. Evaluation was made by the same procedure as in Example 1. The results are shown in Table 1.

EVALUATION METHODS

1. Measurement of saturation magnetization and calculation of Ms.$\delta$

Saturation magnetization (Ms) of the magnetic layer was determined using a specimen vibration type magnetometer (VSM). Also, the specimen was cut in the size of 8 mm×6 mm, and magnetic layer thickness ($\delta$) was calculated from the area and the sputtering speed, and volume and saturation magnetization were calculated from the magnetic layer thickness ($\delta$).

From the product of the values of Ms and $\delta$ obtained by the above method, the values of $Ms1\delta1$ and $MS2\delta2$ were calculated.

2. Method to evaluate signal quality

For the evaluation of signal quality on the slave medium, electromagnetic characteristics measuring system (SS-60; Kyodo Electronics Co., Ltd.) was used. On the slave medium after the magnetic transfer, signals were reproduced by an inductive head with head gap of 0.40 $\mu$m and track width of 3.9 $\mu$m. Then, reproduction output (TAS) immediately after the transfer of the earlier magnetic transfer was measured. Then, magnetic transfer was performed on the surface of the subsequent magnetic transfer, and signals were recorded.

(a) Method to evaluate signal quality on the surface with the earlier magnetic transfer At the same position of the signal recorded on the surface by the earlier magnetic transfer, signal output was measured again, and the result was defined as TAF.

The ratio of TAF to TAS is given in %. If it is more than 94%, it is defined as "very good". If it is 80 to 94%, it is defined as "good". If it is lower than 80%, it is defined as "no good".

(b) Method to evaluate signal quality on the surface with the subsequent magnetic transfer After magnetic transfer was performed on both surfaces, reproduction output on the surface with the subsequent magnetic transfer was measured again, and this was defined as TFF.

The ratio of TFF to TAS is given in %. If it is more than 94%, it is defined as "very good". If it is in the range of 80 to 94%, it is defined as "good", and if it is lower than 80%, it is defined as "no good".

TABLE 1

| | (Ms2 $\delta$ 2)/ (Ms1 $\delta$ 1) | Hdu2/ Hdu1 | Reproduction output immediately after the earlier magnetic transfer (mV) | Signal quality Surface with the earlier magnetic transfer (%) | Signal quality Surface with the subsequent magnetic transfer (%) |
|---|---|---|---|---|---|
| Example 1 | 2.0 | 0.5 | 0.825 | 98 (Very good) | 96 (Very good) |
| Example 2 | 2.0 | 0.2 | 0.786 | 99 (Very good) | 94 (Very good) |
| Example 3 | 2.0 | 0.8 | 0.981 | 96 | 98 |

TABLE 1-continued

| | (Ms2 δ2)/(Ms1 δ1) | Hdu2/Hdu1 | Reproduction output immediately after the earlier magnetic transfer (mV) | Signal quality Surface with the earlier magnetic transfer (%) | Signal quality Surface with the subsequent magnetic transfer (%) |
|---|---|---|---|---|---|
| Example 4 | 4.1 | 0.5 | 0.699 | (Very good) 97 | (Very good) 96 |
| Example 5 | 8.9 | 0.5 | 0.715 | (Very good) 95 | (Very good) 97 |
| Comparative example 1 | 2.0 | 1.0 | 0.752 | (Very good) 62 | (Very good) 98 |
| Comparative example 2 | 2.0 | 0.1 | 0.762 | (No good) 97 | (Very good) 42 |
| Comparative example 3 | 0.5 | 0.5 | 0.901 | (Very good) 86 | (No good) 37 |
| Comparative example 4 | 2.0 | 2.0 | 0.841 | (Good) 69 | (No good) 87 |
| Comparative example 5 | 12.2 | 0.5 | 0.964 | (No good) 91 | (Good) 79 |

As described above, when magnetic transfer is performed from the master carrier for magnetic transfer to the slave medium, it is possible to obtain a slave medium having transfer pattern of high quality on both surfaces. This is accomplished by adjusting the magnetic layer of the master carrier to be used for the earlier magnetic transfer on one surface of the slave medium and the magnetic layer of the master carrier to be used for the subsequent magnetic transfer on the remaining surface of the slave medium, and also by adjusting the intensity of the transfer magnetic field.

What is claimed is:

1. A method for performing magnetic transfer by bringing a master carrier for magnetic transfer and a slave medium in close contact with each other and by applying a magnetic field for-transfer, whereby a product (Ms1δ1) of saturation magnetization (Ms1) and film thickness (δ1) of a magnetic layer of the master carrier to be used for magnetic transfer on a surface of the slave medium with earlier magnetic transfer and a product (MS2δ2) of saturation magnetization (Ms2) and film thickness (δ2) of a magnetic layer of the master carrier to be used for magnetic transfer on the other surface of the slave medium with subsequent magnetic transfer are in a relation of: $1.5<(MS2\delta2)/(Ms1\delta1)<10$, and a transfer magnetic field (Hdu1) applied to the surface with the earlier magnetic transfer and a transfer magnetic field (Hdu2) on the surface of the slave medium with the subsequent magnetic transfer are in a relation of: $0.2 \leq Hdu2/Hdu1 \leq 0.9$.

2. A magnetic transfer method according to claim 1, wherein magnetic transfer performed using the master carrier for magnetic transfer with a magnetic layer formed on a portion corresponding to an information signal on the surface of a substrate and the slave medium to receive magnetic transfer, the slave medium is first magnetized by initial DC magnetization in track direction, the master carrier for magnetic transfer is brought into close contact with the slave medium processed by initial DC magnetization, and magnetic transfer is preformed by applying a transfer magnetic field in a direction opposite to the direction of the initial DC magnetization on the surface of the slave medium.

3. A magnetic recording medium with a servo signal recorded thereon, wherein a product (Ms1δ1) of saturation magnetization (Ms1) and film thickness (δ1) of a magnetic layer of the master carrier for transfer of the servo signal used for magnetic transfer to a surface with earlier magnetic transfer and a product (Ms2δ2) of saturation magnetization (Ms2) and film thickness (δ2) of a magnetic layer of the master carrier for transfer of the servo signal used for transfer to a surface of the magnetic recording medium of the subsequent magnetic transfer are in a relation of: $1.5<(MS2\delta2)/(Ms1\delta1)<10$, and the servo signal is transferred under the condition that a transfer magnetic field (Hdu1) on the surface with the earlier magnetic transfer and a transfer magnetic field (Hdu2) on the surface of the magnetic recording medium with the subsequent magnetic transfer are in a relation of: $0.2 \leq Hdu2/Hdu1 \leq 0.9$.

4. A magnetic recording medium according to claim 3, wherein the magnetic recording medium is first magnetized by initial DC magnetization in track direction, the master carrier for transferring the servo signal is brought into close contact with the magnetic recording medium processed by the initial DC magnetization, a magnetic field for transfer is applied in a direction opposite to the direction of the initial DC magnetization on the surface of the magnetic recording medium, and the servo signal is transferred by magnetic transfer.

5. A magnetic recording medium according to claim 3, wherein the magnetic recording medium is a floppy disk type magnetic recording medium comprising a flexible base material or a hard disk type magnetic recording medium comprising a rigid base material.

* * * * *